US012738415B2

(12) United States Patent
Bananszczyk et al.

(10) Patent No.: US 12,738,415 B2
(45) **Date of Patent: *Sep. 15, 2026**

(54) HV APPARATUS AND A METHOD OF MANUFACTURING SUCH APPARATUS

(71) Applicant: Hitachi Energy Ltd, Zürich (CH)

(72) Inventors: Jedrzej Bananszczyk, Wieliczka (PL); Jan Czyzewski, Cracow (PL); Bartlomiej Adamczyk, Niedzwiedz (PL); Lucasz Bachorz, Cracow (PL); Wojciech Wysocki, Cracow (PL); Marcin Tarnowski, Przasnysz (PL); Roger Hedlung, Ludvika (SE); Peter Sjoberg, Ludvika (SE); Jan Ostlund, Ludvika (SE)

(73) Assignee: Hitachi Energy Ltd, Zürich (CH)

( * ) Notice: Subject to any disclaimer, the term of this patent is extended or adjusted under 35 U.S.C. 154(b) by 37 days.

This patent is subject to a terminal disclaimer.

(21) Appl. No.: 18/118,910

(22) Filed: Mar. 8, 2023

(65) Prior Publication Data

US 2023/0223189 A1 Jul. 13, 2023

Related U.S. Application Data

(60) Division of application No. 16/170,211, filed on Oct. 25, 2018, now Pat. No. 11,605,501, which is a (Continued)

(30) Foreign Application Priority Data

Apr. 25, 2016 (EP) .................................... 16460025

(51) Int. Cl.

*H01F 38/26* (2006.01)
*H01F 27/02* (2006.01)

(Continued)

(52) U.S. Cl.

CPC ............. *H01F 38/26* (2013.01); *H01F 27/02* (2013.01); *H01F 27/24* (2013.01); *H01F 27/29* (2013.01);

(Continued)

(58) Field of Classification Search

CPC .......... H01F 38/26; H01F 27/02; H01F 27/24; H01F 27/29; H01F 27/321; H01F 38/30;

(Continued)

(56) References Cited

U.S. PATENT DOCUMENTS 2,149,529 A * 3/1939 La Fave ................ H01F 27/022 336/107
2,703,390 A * 3/1955 Marks ..................... H01F 38/30 336/173

(Continued)

FOREIGN PATENT DOCUMENTS

CH 698970 * 12/2009
CN 1168746 A 12/1997

(Continued)

OTHER PUBLICATIONS

European Patent Office, International Search Report & Written Opinion issued for Application No. PCT/EP2017/000305 mailed Jun. 21, 2017, 10 pages.

(Continued)

*Primary Examiner* — Mang Tin Bik Lian
(74) *Attorney, Agent, or Firm* — Sage Patent Group

(57) ABSTRACT

A high voltage (HV) apparatus insulated with an insulating gel includes at least two electrically conductive elements, such as a head transformer cover, a head housing base, a core casing, a primary conductor, bottom external housing, a bottom support flange, and/or a core. At least one of the electrically conductive elements has a coating made of solid insulating material separating the surface of the conductive (Continued)

element from the insulating gel and adapted for limiting electron emission from the conductive elements into the insulating gel.

20 Claims, 7 Drawing Sheets

Related U.S. Application Data continuation of application No. PCT/EP2017/000305, filed on Mar. 7, 2017.

(51) Int. Cl.

| | |
|---|---|
| ***H01F 27/24*** | (2006.01) |
| ***H01F 27/29*** | (2006.01) |
| ***H01F 27/32*** | (2006.01) |
| ***H01F 38/30*** | (2006.01) |
| ***H01F 38/36*** | (2006.01) |
| ***H01F 41/02*** | (2006.01) |
| ***H01F 41/06*** | (2016.01) |

(52) U.S. Cl.
CPC .......... *H01F 27/321* (2013.01); *H01F 38/30* (2013.01); *H01F 38/36* (2013.01); *H01F 41/0206* (2013.01); *H01F 41/06* (2013.01)

(58) Field of Classification Search
CPC .......... H01F 38/36; H01F 38/28; H01F 38/34; H01F 27/324; H01F 27/327
See application file for complete search history.

(56) References Cited

U.S. PATENT DOCUMENTS

| | | | | | |
|---|---|---|---|---|---|
| 3,299,383 | A * | 1/1967 | Conner | H01F 38/30 | 336/84 R |
| 3,380,009 | A * | 4/1968 | Miller | H01F 38/30 | 336/84 R |
| 3,525,908 | A * | 8/1970 | Allmendinger | H01F 38/30 | 336/174 |
| 3,668,513 | A * | 6/1972 | Tsubouchi | H01F 38/28 | 323/361 |
| 4,196,408 | A * | 4/1980 | Link | H01B 3/22 | 174/17 LF |
| 4,320,372 | A | 3/1982 | Thuries et al. | | |
| 4,511,873 | A | 4/1985 | Baier et al. | | |
| 4,701,738 | A * | 10/1987 | Preissinger | H01F 38/30 | 336/107 |
| 4,775,849 | A | 10/1988 | Lucas | | |
| 4,808,910 | A * | 2/1989 | Kessi | H02B 11/26 | 336/174 |
| 4,845,453 | A * | 7/1989 | Preissinger | H01F 38/26 | 336/84 C |
| 5,548,081 | A * | 8/1996 | Rost | H01F 38/30 | 174/25 G |
| 5,881,990 | A * | 3/1999 | Kawamura | F02B 63/04 | 280/30 |
| 6,211,764 | B1 * | 4/2001 | Schweitzer, Jr. | H01F 27/2804 | 336/217 |
| 6,235,992 | B1 | 5/2001 | Abisso et al. | | |
| 2012/0056702 | A1 * | 3/2012 | Sebastian Balsalobre | H01F 38/34 | 336/96 |
| 2012/0092115 | A1 | 4/2012 | Srinivastro et al. | | |
| 2017/0149226 | A1 | 5/2017 | Nakauchi et al. | | |

FOREIGN PATENT DOCUMENTS

| | | | | |
|---|---|---|---|---|
| EP | 0653767 B1 | | 1/1998 | |
| EP | 2800112 A1 | * | 11/2014 | H01F 27/022 |
| JP | 60091606 A | * | 5/1985 | H01F 27/02 |
| JP | H03159216 A | | 7/1991 | |
| JP | H05315155 A | | 11/1993 | |
| WO | 9611521 A1 | | 4/1996 | |
| WO | 2009146569 A1 | | 12/2009 | |

OTHER PUBLICATIONS

European Patent Office, Extended Search Report issued in corresponding Application No. 16460025.6 mailed Oct. 31, 2016, 9 pages.
Chinese Second Office Action dated Jun. 3, 2021 for Chinese Patent Application No. 201780025910.7, 12 pages (including English translation).
Indian Examination Report dated Jun. 7, 2021 for Indian Patent Application No. 201847043586, 4 pages.

* cited by examiner

HV APPARATUS AND A METHOD OF MANUFACTURING SUCH APPARATUS

CROSS REFERENCE TO RELATED APPLICATIONS

This application is a divisional of U.S. patent application Ser. No. 16/170,211, filed Oct. 25, 2018, now U.S. Pat. No. 11,605,501, issued Mar. 14, 2023, which is a continuation of PCT International Application No. PCT/EP2017/000305, filed on Mar. 7, 2017, which claims benefit of priority to European Patent Application No. 16460025.6, filed Apr. 25, 2016, the disclosures and content of which are incorporated by reference herein in their entirety.

TECHNICAL FIELD

The present disclosure refers to a HV apparatus and a method of manufacturing a HV apparatus, in particular a HV dry instrument transformer, which has a form of a current transformer, a voltage transformer or combined transformer with a gel insulation.

BACKGROUND

From U.S. Pat. No. 6,235,992 patent description there is known an electric device for medium and high voltage transmission and/or distribution lines, having a free volume V undergoing electrical stress and including an insulating filler that fills the free volume, wherein the insulating filler includes a compressible silicone-based composition, having a volume under normal condition ranging from 1.01 to 1.2 V at a temperature of 25° C. The silicone-base composition may include hollow compressible plastic microspheres. The silicone-base composition may also include a crosslinkable polyorganosiloxane and an organosilicon crosslinker.

Silicones are generally expensive materials, and for this reason the dimensions of the instrument transformer and the volume of the insulation material required for filling must be kept as small as possible. The dielectric strength of the silicone gel determines the insulation distances between the elements in the insulation system and hence the dimensions of the entire apparatus. During operation of a high voltage instrument transformer electrons are ejected from the cathodes into the gel by either field emission or by the field enhanced thermionic effect, leading potentially to avalanche ionization of the atoms in the gel, caused by electron collision in the applied field. For that reason application of insulating gel in direct contact with bare metal electrodes is likely to lead to dimensions of the insulation system that are too big to make it cost efficient.

From JP patent description JPH05315155 a HV stationary induction apparatus is known, which apparatus has a main body placed in a circular case filled with gel insulator. The inner surface of the case is covered with a Teflon coating, in order to prevent adhesion of the gel to the metal surface of the cover, which prevents crack generation in the gel insulator due to the displacement of the apparatus case. The inventive concepts do not not solve the problem of increasing the dielectric withstand of the apparatus insulation system, and therefore do not render possible reduction of the overall apparatus dimensions.

There is known from EP patent application EP2800112 a HV instrument transformer based on a new type of combined dry insulation system. High voltage instrument transformer has a form of current transformer or a voltage transformer. The current transformer has a head insulating body having a form of a bushing for electrical insulation of the secondary winding assembly from the primary winding conductor, the head insulating body being placed within a conductive encapsulation and being in contact with the insulating member. The insulating member is made of an elastic compressible material or an elastic conformable material which tightly adheres to matching outer surfaces of the head insulating body, the column insulating body, a winding shield and to the inner surface of the conductive encapsulation of the current transformer. A voltage transformer has the insulating member which is made of the same material as for the current transformer and the insulating member tightly adheres to matching outer surfaces of the primary winding, column insulating body and to the inner surface of the conductive encapsulation. The inventive concepts address the problem of the large size of dry instrument transformers, by introduction of field grading, which allows for efficient exploitation of the field strength of the dry insulating material. The apparatus is capable of operation in a broad temperature range, as the insulating member is capable of accommodation of the thermal shrinkage and expansion of the adjacent elements of the instrument transformer. The inventive concepts do not introduce any direct means of increasing the dielectric withstand of the insulation system.

SUMMARY

The essence of a high voltage apparatus having an electrically conductive head transformer cover, an electrically conductive head housing base, an electrically conductive core casing, primary conductor, and an electric insulation material comprising insulating gel, filling enclosed space between at least two of the electrically conductive elements, is that at least one of the electrically conductive elements has a coating made of a solid insulating material, separating the surface of the conductive element from the insulating gel. The coating is adapted for limiting the electron emission from the conductive elements into the insulating gel.

Preferably the coating is placed on an internal surface of the head transformer cover and on an internal surface of the head housing base.

Preferably the coating is placed on an external surface of the core casing.

Preferably the core casing is filled with a light filler material placed between the core and a part of a lead tube, which is sealed by means of the secondary lead plug.

Preferably the coating is placed on an external surface of the primary conductor.

Preferably the head transformer housing is equipped with an inlet channel placed in the head housing base and with an outlet channel placed in the top of the head transformer housing.

Preferably the length of the both channels is bigger than their diameters with a ratio between 2:1 and 20:1.

The essence of a high voltage apparatus having, an electrically conductive bottom external housing, an electrically conductive bottom support flange, an electrically conductive core and an electric insulation material comprising insulating gel, filling an enclosed space between at least two of the electrically conductive elements, is that at least one of the electrically conductive elements has a coating made of a solid insulating material, separating the surface of the conductive element from the insulating gel. The coating is adapted for limiting the electron emission from the conductive elements into the insulating gel.

Preferably the coating is placed on an internal surface of a bottom external housing and on an internal surface of bottom a support flange.

Preferably the coating is placed on an external surface of the core.

The essence of a method of manufacturing a HV apparatus, having a step of preparing elements of a dry HV current transformer, a step of mounting such elements, a step of filling the head transformer housing with an insulation gel, is that the method comprises a step of covering at least one of the chosen elements of the HV dry current transformer with a solid insulation material coating, which is performed after preparing a core set for the current transformer and before filing the head transformer housing, having a head housing cover and a head housing base with an insulation gel.

Preferably the coating is placed on an internal surface of the head transformer cover, on an internal surface of a head housing base, on an external surface of a core casing, on an external surface of a primary conductor.

The essence of a method of manufacturing a HV apparatus, having a step of preparing elements of a dry HV voltage transformer, a step of mounting such elements, a step of filling a bottom external housing with an insulation gel, is that the method comprises a step of covering at least one of the chosen elements of the dry HV voltage transformer with a solid insulation material coating, which is performed after preparing a core for a voltage transformer and before filing the bottom external housing with the insulation gel.

Preferably the coating is placed on an internal surface of the bottom external housing, on an internal surface of the bottom support flange or on an external surface of the core.

Coating the surface of the metal elements that are in contact with the insulating gel, with a solid insulation material coating, renders it possible to limit the electron emission from the surface of the metal. The coating traps the emitted electrons, preventing ionization of the gel, and in consequence it significantly improves the dielectric withstand of the insulation system. This makes it possible to decrease the distances between the electrodes and hence to reduce the volume of the insulating gel required for filling. This way the cost of the entire instrument transformer apparatus can also be reduced.

BRIEF DESCRIPTION OF THE DRAWINGS

The inventive concepts are depicted in an exemplary embodiment on the drawing, where.

DETAILED DESCRIPTION OF EMBODIMENTS

Figure 1:
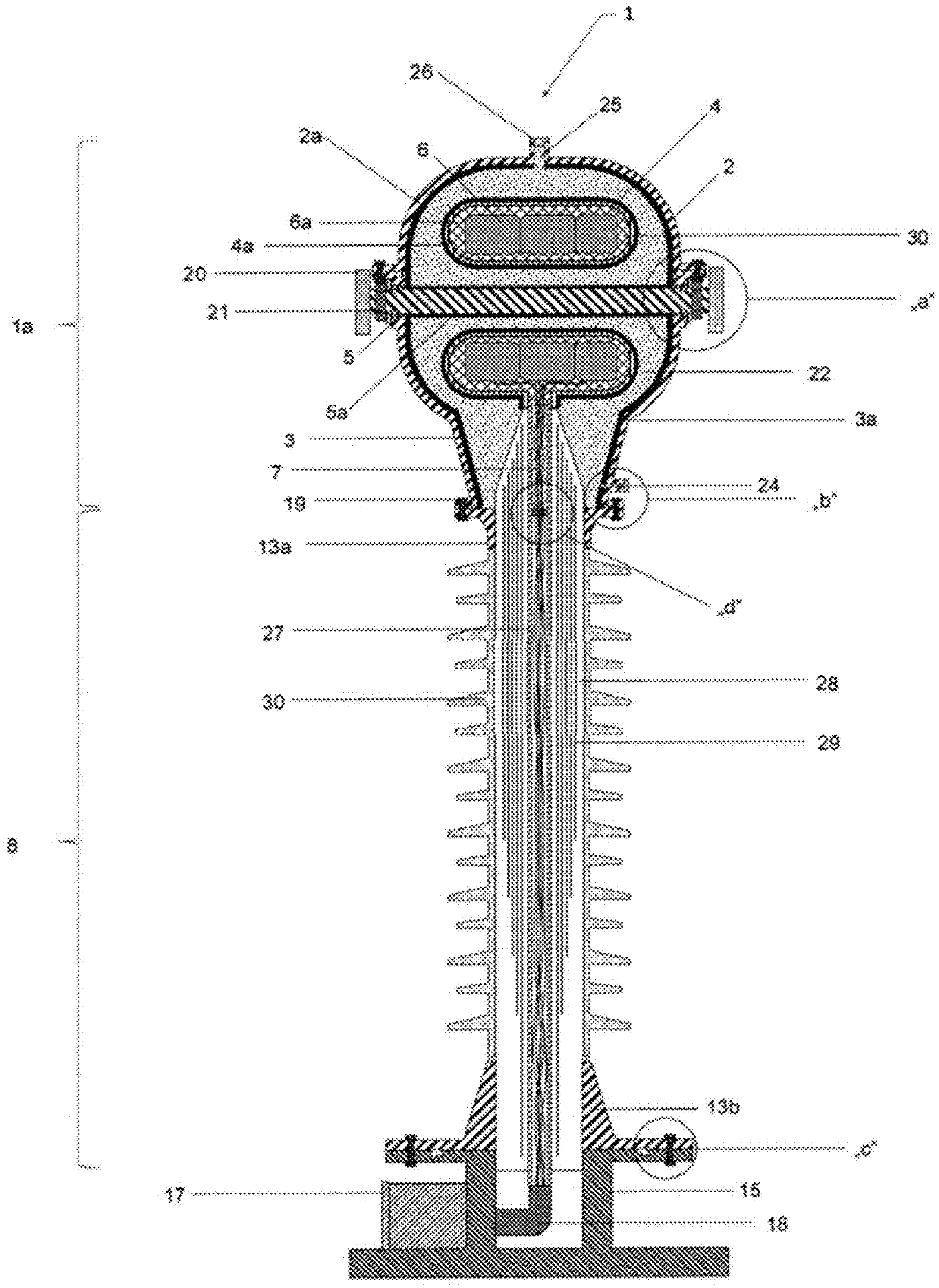
FIG. 1 presents a first embodiment of the inventive concepts in the form of current transformer in a cross-section.
Figure 2:
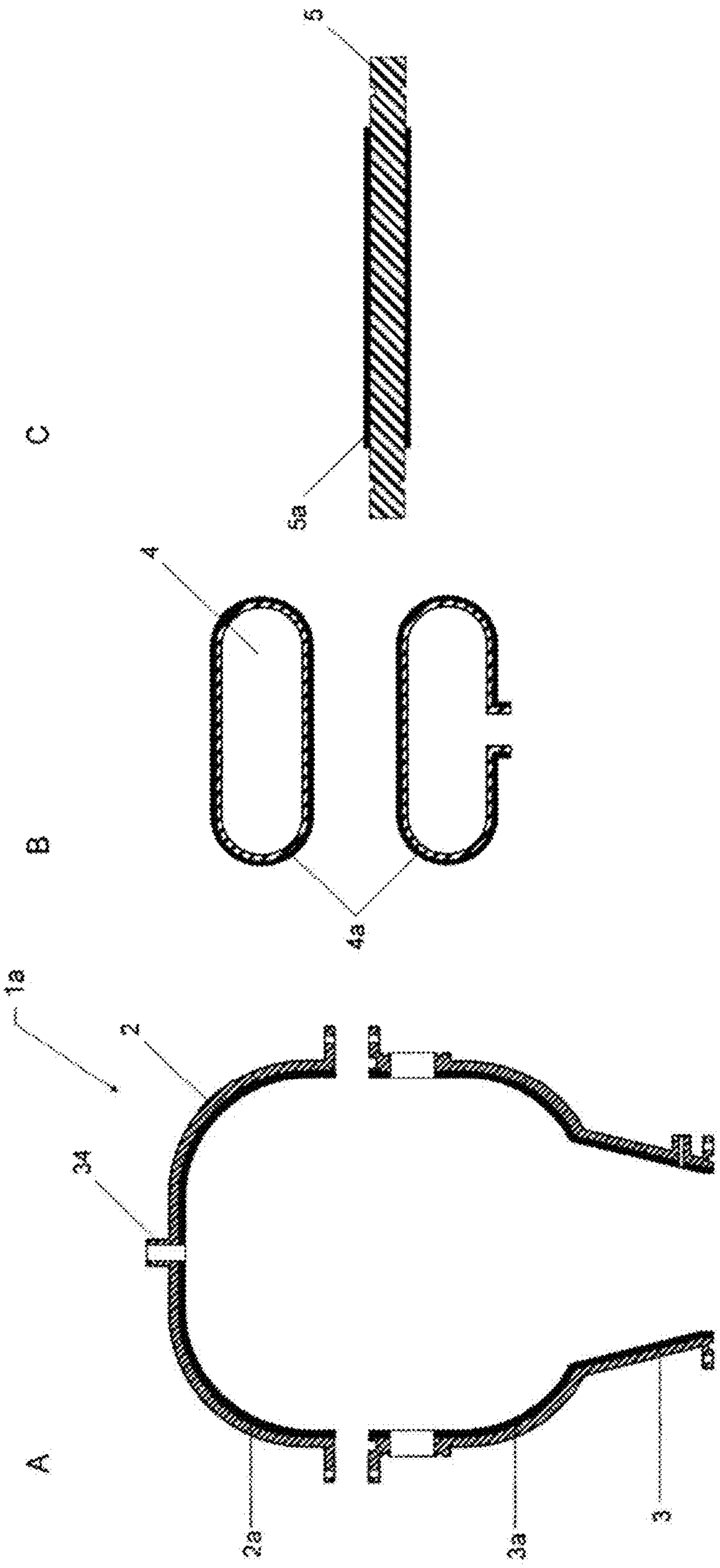
FIG. 2 presents an arrangement of solid insulation material coating for the embodiment presented in FIG. 1 for: A) head housing cover and base, B) core casing, C) primary conductor.
Figure 3:
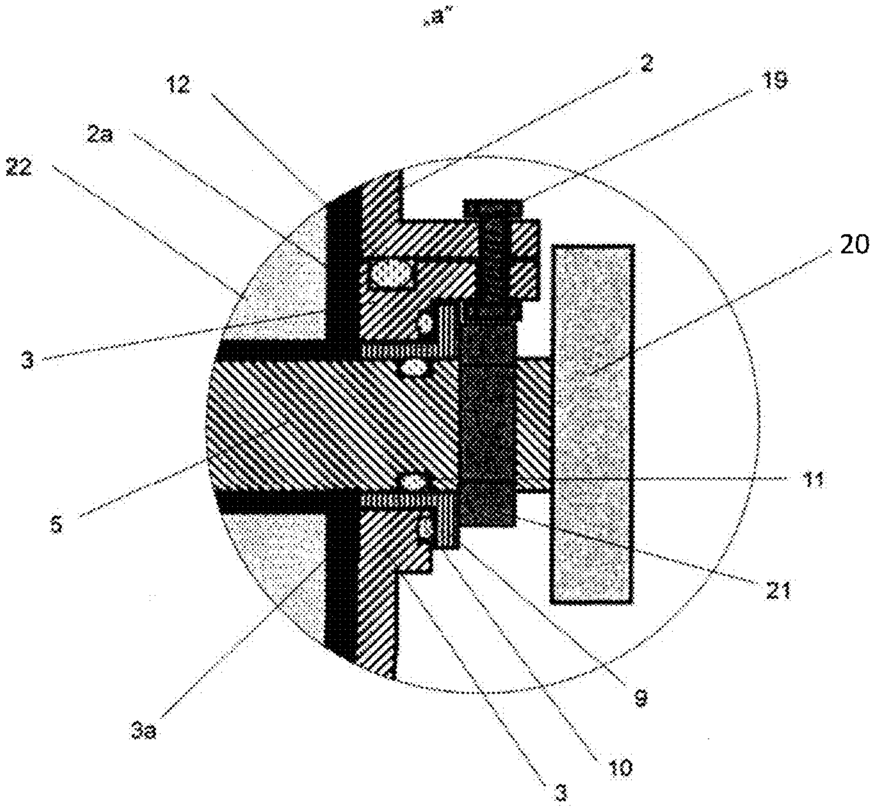
FIG. 3 presents a detail "a" from FIG. 1.
Figure 4:
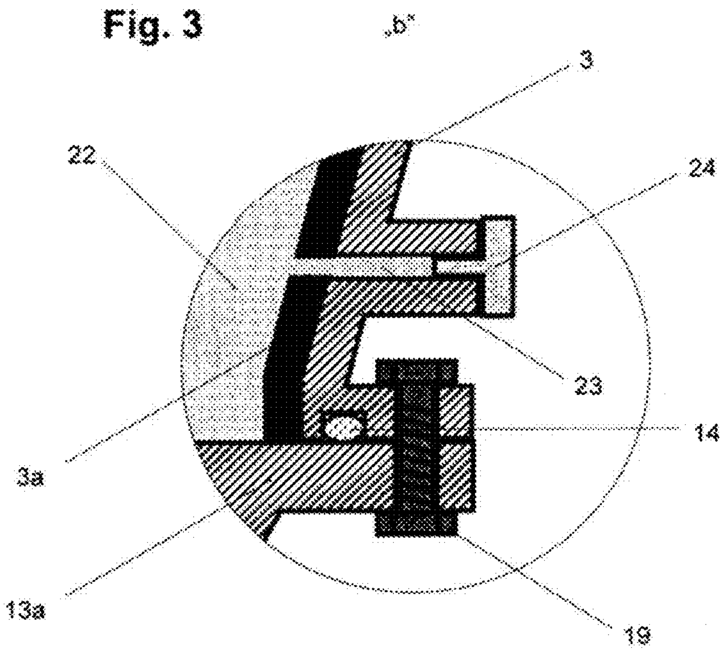
FIG. 4 presents a detail "b" from FIG. 1.
Figure 5:
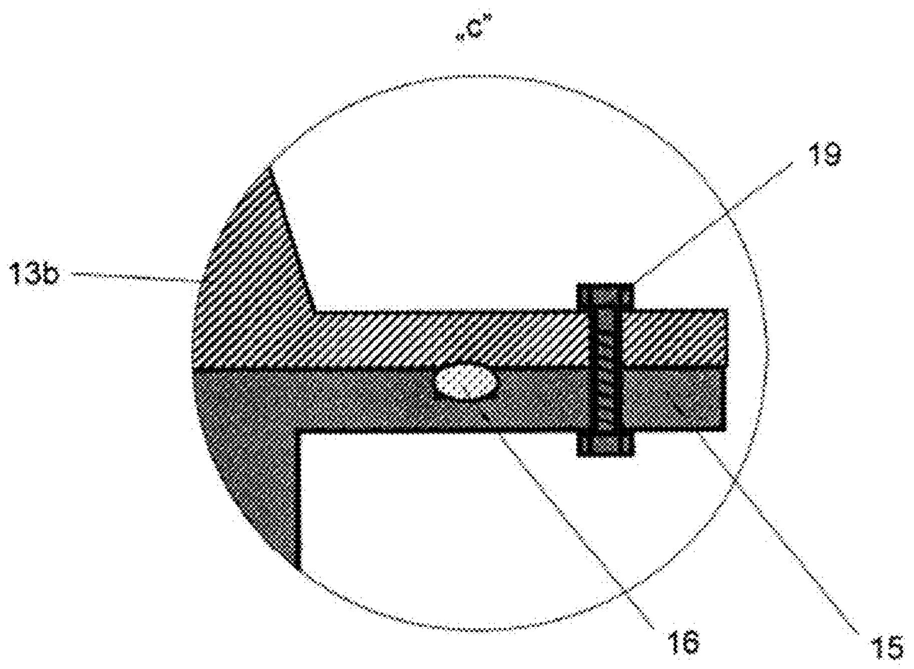
FIG. 5 presents a detail "c" from FIG. 1.
Figure 6:
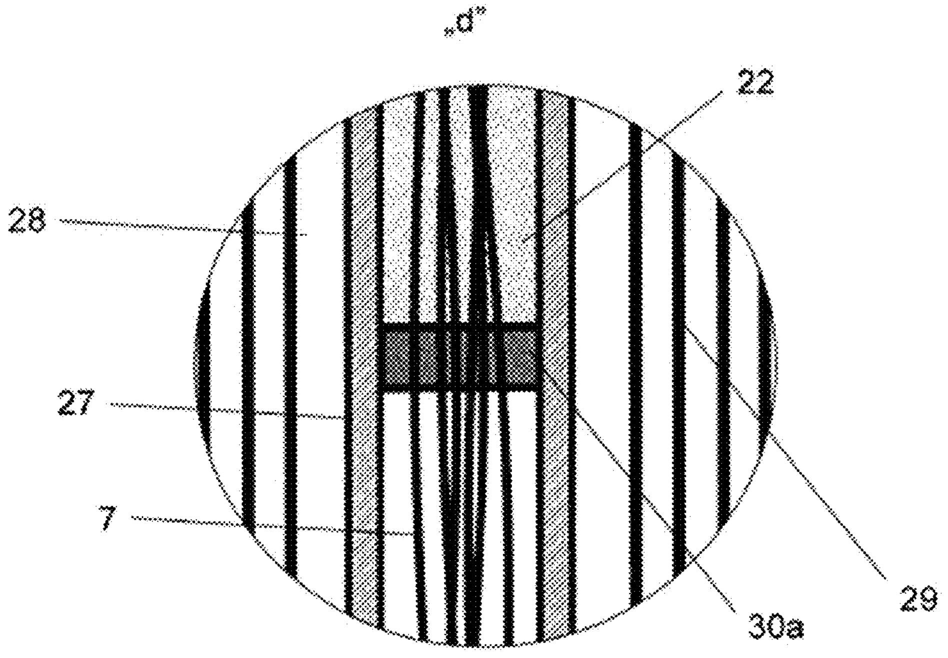
FIG. 6 presents a detail "d" from FIG. 1.
Figure 7:
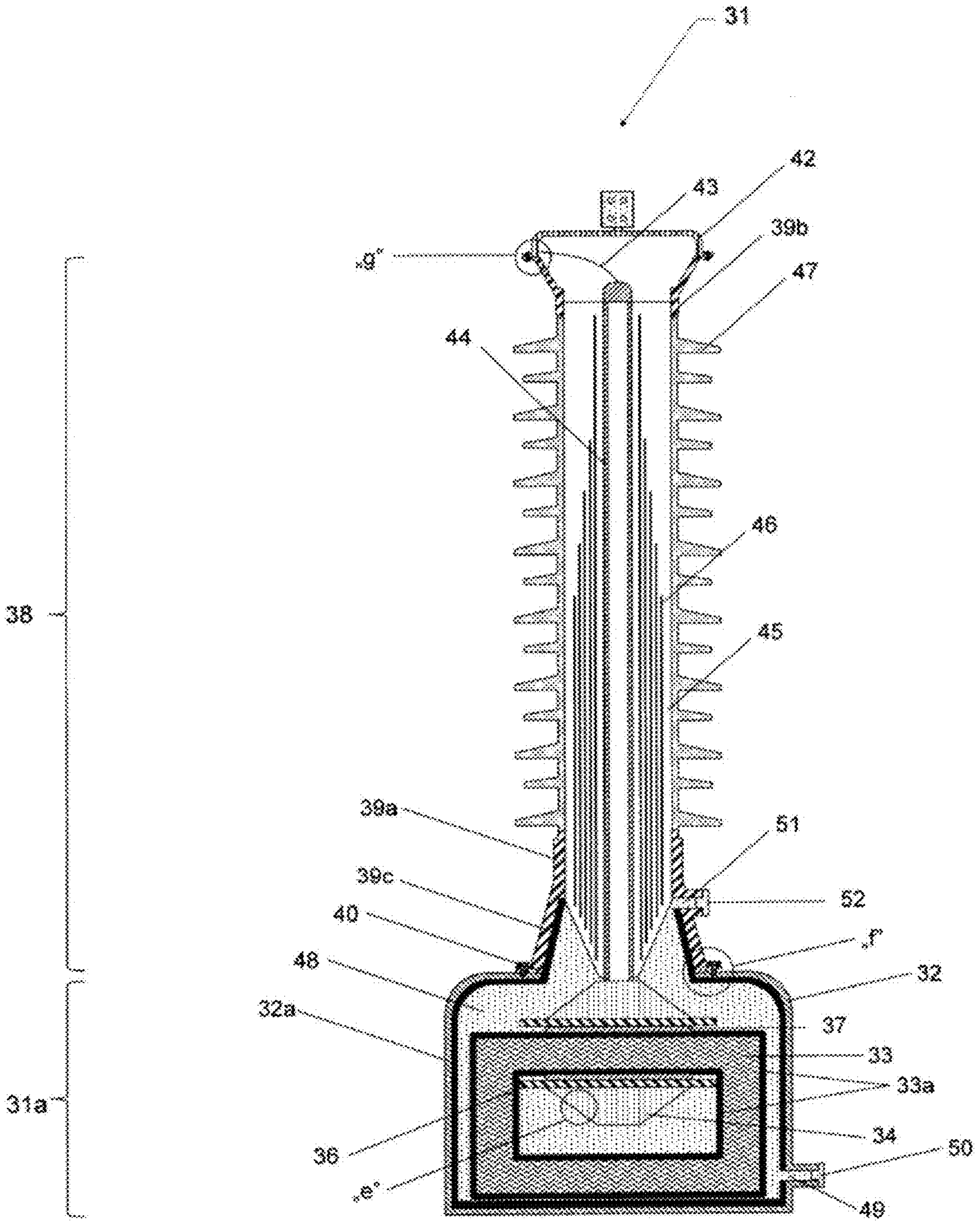
FIG. 7 presents a second embodiment of the inventive concepts in the form of voltage transformer in a cross-section.
Figure 8:
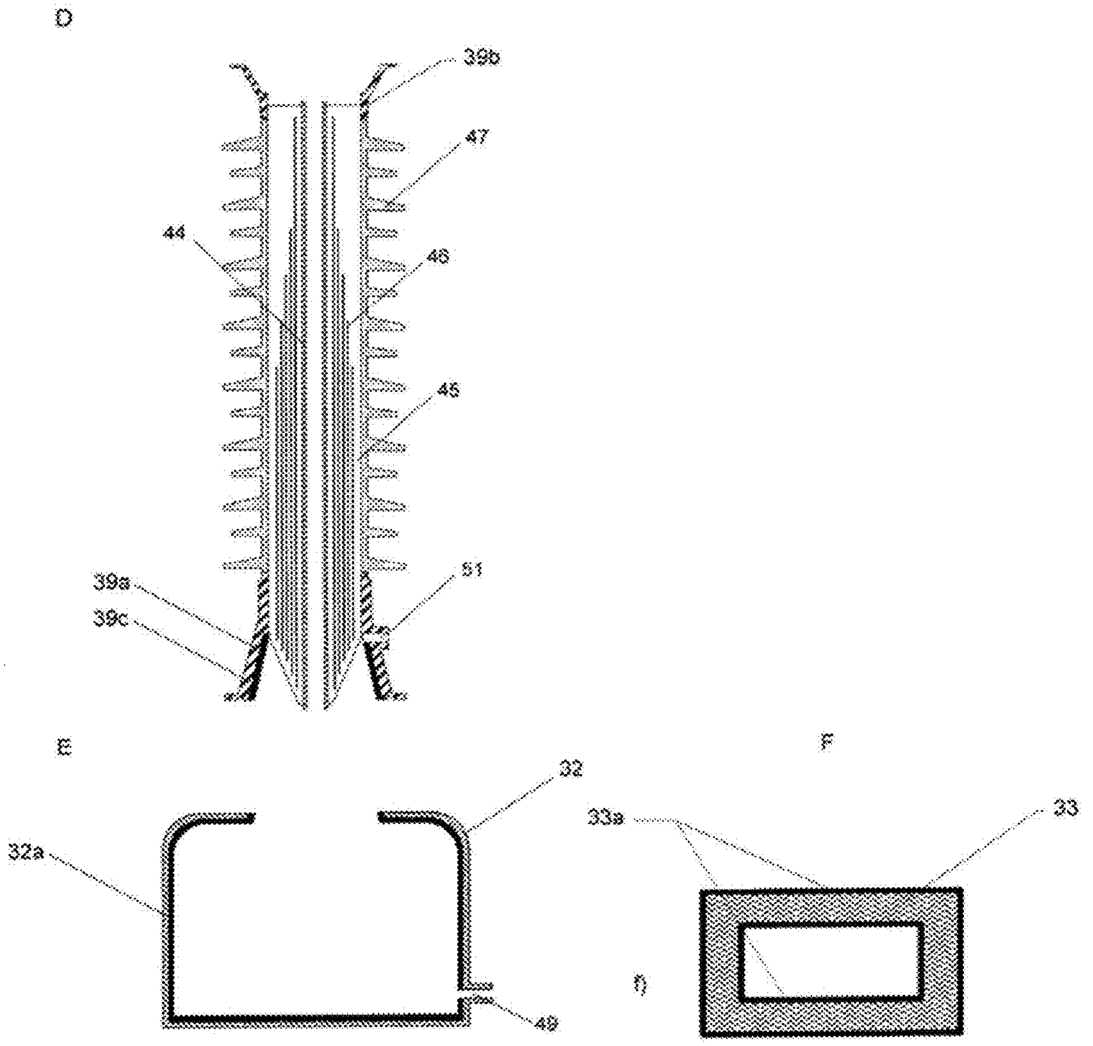
FIG. 8 presents an arrangement of solid insulation material coating for the embodiment presented in FIG. 7 for: D) bottom flange of the column of the voltage transformer, E) bottom external housing, F) core.
Figure 9:
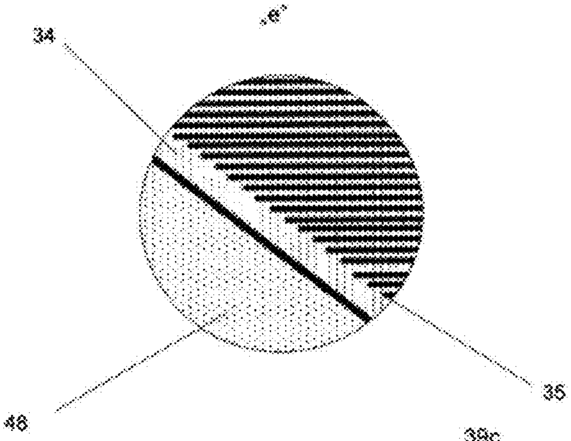
FIG. 9 presents a detail "e" from FIG. 7.
Figure 10:
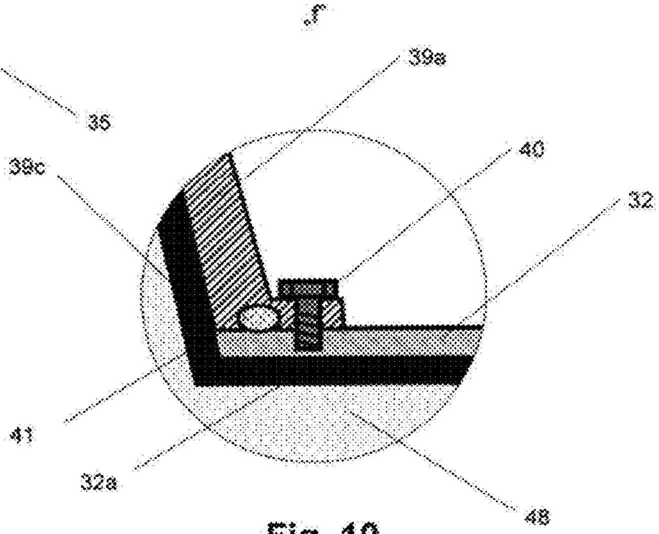
FIG. 10 presents a detail "f" from FIG. 7.
Figure 11:
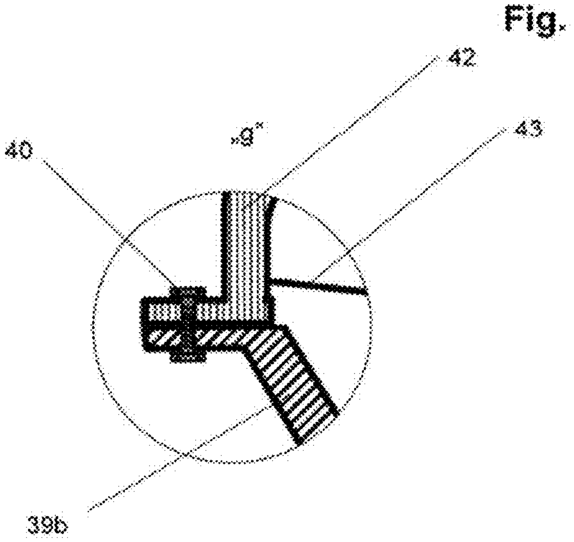
FIG. 11 presents a detail "g" from FIG. 7.

The instrument transformer having a form of a current transformer 1 according to the inventive concepts presented on FIGS. 1-6, consists of a head transformer housing 1*a* having a head housing cover 2 connected with a head housing base 3. The internal surface of the head housing cover 2 and the head housing base 3 is covered with a solid insulation material coating 2*a* and 3*a*, respectively. Inside the head transformer housing 1*a* a core casing 4 is placed. An external surface of the core casing 4 is covered with a solid insulation material coating 4*a*, the same kind as the coatings 2*a* and 3*a*. A primary conductor 5 runs through the housing base 3, and the part of the conductor 5 which is located inside the head housing base 3 is coated with a solid insulation material coating 5*a*, similar like the coating 4*a*. In the core casing 4 a core set 6 is located, connected with secondary winding leads 7, running through a current transformer column 8. The core set 6 is embedded in a light filler material 6*a*, such as e.g. polyurethane foam. The primary conductor 5 is insulated from the head housing base 3 by primary conductor insulators 9, which are sealed in the head housing base 3 by a pair of primary conductor insulator gaskets 10 arranged from to opposite side of the head. In FIG. 3 the only one side of the head is presented. The primary conductor 5 is also sealed from two sides of the housing base 3 by primary conductor gaskets 11. Between the top part of the base 3 and the head housing cover 2 there is a top cover gasket 12 situated. Between the lower part of the base 3 and a top support flange 13*a* placed on the column 8 there is a head housing base gasket 14. A bottom support flange 13*b* of the column 8 is placed on a current transformer base 15 and is sealed by a current transformer base gasket 16. To the current transformer base 15 a secondary terminal box 17 is connected to which a secondary winding lead connector 18 is fixed for connecting secondary winding leads 7 with its terminals. The bottom support flange 13*b* and the current transformer base 15 are connected together with mounting screws 19. To the end of primary conductor 5 projected from the head a pair of primary conductor terminals 20 is coupled. Between the terminals 20 and a top part of the head housing base 3, external to the top part of the head housing base 3 primary conductor nuts 21 are placed to keep the primary conductor 5 in a fixed position. In order to fill a space inside the head transformer housing 1*a* of the current transformer 1 with insulating gel 22 a filling channel 23 is carried out in the bottom of the housing base 3, which is closed by an inlet plug 24. A filing outlet 25 of the insulating gel 22 is situated on the top of the head housing cover 2 and it is closed by an outlet plug 26. The secondary winding leads 7 are placed in a current transformer lead tube 27, which is placed concentrically within a bushing 28, having field grading layers 29. The current transformer lead tube 27 is sealed by means of the secondary lead plug 30*a*, through which the secondary leads 7 are passed. Between the top support flange 13*a* and the bottom support flange 13*b* an external insulator 30 is placed. The coating 2*a*, 3*a*, 4*a* and 5*a* is carried out by known technological processes e.g. plasma spraying, flame spraying, powder spraying, or other known method of coating the metal surfaces.

The method of manufacturing process of the current transformer comprises the following steps:

a) Preparing the current transformer 1 elements for assembly of the head transformer housing 1*a* having the head housing cover 2 and the head housing base 3, the core casing 4, the primary conductor 5, next the core set 6 with secondary winding leads 7, the primary conductor insulators 9, the top cover gasket 12, the head housing base gasket 14, the primary conductor gaskets 11, the primary conductor insulator gaskets 10, the primary conductor terminals 20, the primary conductor nuts 21, the filling inlet sealing plug 24 and the filling outlet sealing plug 26; preparation of the current transformer column 8, which comprises the current transformer lead tube 27, column insulating body of current bushing 28 with field-grading layers 29, support flanges top 13*a* and bottom 13*b*, external insulator of current transformer 30, secondary lead plug 30*a*; preparation of the current transformer base 15, the current transformer base gasket 16, the secondary terminal box 17, the secondary winding lead connector 18 and on the end mounting screws 19;

b) Coating the internal surface of the head housing cover 2 and the head housing base 3, the external surface of the core casing 4, the external surface of the primary winding conductor 5 with a solid insulation material coating 2*a*, 3*a*, 4*a*, 5*a*, respectively, by means of e.g. plasma spray, flame spray, powder spray or other known coating process;

c) Fitting the core set 6 with the secondary winding leads 7 into the core casing 4 and filling of the remaining void space in the core casing 4 with a light filler material 6*a;* d) Mounting the column of the current transformer 8 on the current transformer base 15, mounting the head housing base 3 on the current transformer column 8, mounting the core casing 4 on the current transformer lead tube 27, mounting the primary conductor insulators 9 in the head housing base 3 and mounting the primary conductor 5 in either the head housing base 3, or the head housing cover 2;

e) Covering the head housing base 3 with the head housing cover 2 and securing it with mounting screws 19, forming the head transformer housing 1*a;* f) Filling the head transformer housing 1*a* with the insulating gel 22 by means of any known vacuum filling process;

g) Sealing of the filling inlet channel 23 with the filling inlet sealing plug 24 and sealing the filling outlet channel 25 with the filling outlet sealing plug 26.

During step f) the design of the filling inlet channel 23 and the filling outlet channel 25 is prepared in such a way that the length of the channels to their diameters has a ratio between 2:1 and 20:1. Such ratio allows for electrical screening any air voids remaining after filling with the current transformer insulating gel 22 inside the filling inlet channel 23 or the filling outlet channel 25, because the electric field intensity in the channel area is low and cannot give rise to partial discharge during the operation of the current transformer 1.

The instrument transformer having a form of a voltage transformer 31 according to the inventive concepts presented on FIGS. 7-11, consists of a bottom external housing 32 and an iron core 33. The internal surface of the bottom external housing 32 and the external surface of the core 33 are covered with a solid insulation material coating 32*a* and 33*a* respectively. A primary winding 34 with the layers 35 wound on the primary winding tube 36 and a secondary winding 37 are fitted on the core 33. The layers 35 of the primary winding can be made of paper, synthetic nonwoven or e.g. PET. The layers can be impregnated with epoxy or silicone. A column of the voltage transformer 38 is fixed to the bottom external housing 32 by means of the bottom support flange 39*a*. The internal surface of the bottom support flange 39*a* is covered with a high dielectric strength coating 39*c*. The bottom support flange 39*a* is fixed to the bottom external housing 32 by means of screws 40 and the connection is sealed with the external housing gasket 41. A HV electrode 42 is fixed to the top support flange 39*b* by means of screws 40, and it is connected to the primary winding 34 by means of the HV lead 43 and the voltage transformer lead tube 44. The voltage transformer lead tube 44 is placed concentrically within a bushing 45, having field grading layers 46. Between the top support flange 9*b* and the bottom support flange 39*a* an external insulator 47 is placed. In order to fill the space inside the base 31*a* of the voltage transformer 31 with insulation gel 48 a filling channel 49 is carried out in the bottom external housing 32, which is closed by an inlet plug 50. A filing outlet channel 51 of the insulation gel 48 is situated in the bottom support flange 39*a* and it is closed by an outlet plug 52. The coating 32*a*, 33*a*, and 39*c* is carried out by known technological processes e.g. plasma spraying, flame spraying, powder spraying or other known method of coating the metal surfaces.

The method of manufacturing process of the voltage transformer comprises the following steps:

a) Preparing of the voltage transformer 31 elements for assembly of the base 31 a of the voltage transformer 31 having the bottom external housing cover 32 the core 33, the primary winding 34 with layers 35, wound on the primary the winding tube 36, the secondary winding 37, the mounting screws 40, the external housing gasket 41, the filling inlet plug 50 and the filling outlet plug 52; preparation of the column 38 of the voltage transformer 31, which comprises the bottom support flange 39*a*, the top support flange 39*b*, the HV electrode, the HV lead 43, the lead tube 44, the column insulating bushing 45, the field grading layers 46 the external insulator 47;

b) Coating the internal surface of the bottom external housing 32, the external surface of the core 33, and the internal surface of the bottom support flange 39*a* with a solid insulation material coating 32*a*, 33*a*, 39*c*, respectively, by means of e.g. plasma spray, flame spray, powder spray or other known coating process;

c) Fitting the primary winding 34, wound on the primary winding tube 36 and the secondary winding 37 concentrically on the core 33 and fitting the core 33 with the mounted primary winding 34 and secondary winding 37 into the bottom external housing 32;

d) Mounting the column 38 of the voltage transformer 31 on the voltage transformer base 31*a*, and connecting the lead tube 44 with the primary winding 34;

e) Covering the column 38 with the HV electrode 42 and connecting the HV electrode 42 with the HV lead 43;

f) Filling the base 31 a with the insulating gel 48 by means of any known vacuum filling process;

g) Sealing the filling inlet channel 49 with the filling inlet plug 50 and sealing the filling outlet channel 51 with the filling outlet sealing plug 52.

The HV combined transformer is manufactured in a manner presented for both HV instrument transformer and a HV voltage transformer.

1—current transformer
1*a*—head transformer housing
2—head housing cover
2*a*—coating of head housing cover

3—head housing base
3*a*—coating of head housing base
4—core casing
4*a*—coating of core casing
5—primary conductor
5*a*—coating of primary conductor
6—core set
6*a*—light filler material
7—secondary winding leads
8—current transformer column
9—primary conductor insulators
10—primary conductor insulator gaskets
11—primary conductor gaskets
12—top cover gasket
13*a*—top support flange
13*b*—bottom support flange
14—head housing base gasket
15—current transformer base
16—current transformer base gasket
17—secondary terminal box
18—secondary winding lead connector
19—mounting screws
20—primary conductor terminals
21—primary conductor nuts
22—insulating gel for the head transformer housing
23—filing inlet channel
24—filling inlet plug
25—filing outlet channel
26—filling outlet plug
27—current transformer lead tube
28—column insulating bushing
29—field-grading layers of bushing
30—external insulator of current transformer
30*a*—secondary lead plug
31—voltage transformer
31*a*—base of the voltage transformer
32—bottom external housing
32*a*—coating of external housing
33—core
33*a*—coating of core
34—primary winding
35—layers of primary winding
36—primary winding tube
37—secondary winding
38—column of the voltage transformer
39*a*—bottom support flange
39*b*—top support flange
39*c*—coating of bottom support flange
40—mounting screws
41—external housing gasket
42—HV electrode
43—HV lead
44—lead tube of the voltage transformer
45—column insulating bushing
46—field grading layers of the bushing
47—external insulator of the voltage transformer
48—insulating gel of the voltage transformer
49—filling inlet channel
50—filling inlet plug
51—filling outlet channel
52—filling outlet plug

The invention claimed is:

1. A high voltage (HV) apparatus in a form of a HV voltage transformer comprising:

electrically conductive elements comprising an electrically conductive bottom external housing, an electrically conductive bottom support flange, and an electrically conductive core; and electric insulation material comprising an insulating gel filling an enclosed space between at least two of the electrically conductive elements, wherein at least two of the electrically conductive elements each have, on a surface thereof, a respective coating made of solid insulating material, the coating being conformal to the surface, adhering to the surface, separating the surface from the insulating gel, with the insulating gel adhering to the coating, and wherein the coating is adapted for limiting the electron emission from the at least two of the electrically conductive elements into the insulating gel.

2. The apparatus according to claim 1, wherein the bottom external housing is one of the at least two electrically conductive elements having a respective coating, and wherein the respective coating of the bottom external housing is disposed on an internal surface of the bottom external housing.

3. The apparatus according to claim 1, wherein the bottom support flange is one of the at least two electrically conductive elements having a respective coating, and wherein the respective coating of the bottom support flange is disposed on an internal surface of the bottom support flange.

4. The apparatus according to claim 1, wherein the core is one of the at least two electrically conductive elements having a respective coating, and wherein the respective coating of the core is disposed on an external surface of the core.

5. The apparatus according to claim 1, wherein the coating comprises a high dielectric strength material.

6. The apparatus according to claim 1, further comprising an external insulator on the bottom support flange, and a top support flange on the external insulator.

7. The apparatus according to claim 6, further comprising a transformer lead tube in the external insulator.

8. The apparatus according to claim 1, further comprising:

an inlet channel in the bottom external housing; and an inlet plug in the inlet channel.

9. The apparatus according to claim 8, further comprising:

an outlet channel in the bottom support flange; and an outlet plug in the outlet channel.

10. The apparatus according to claim 1, further comprising:

a primary winding tube around the core; and a primary winding around the primary winding tube;

wherein the core is one of the at least two electrically conductive elements having a respective coating, and wherein the respective coating of the core is at least partially disposed between the core and the primary winding tube.

11. A high voltage (HV) transformer comprising:

an electrically conductive bottom external housing;

an electrically conductive core within the bottom external housing; and electric insulation material comprising an insulating gel filling an enclosed space between the bottom external housing and the core;

wherein the bottom external housing has, on a surface thereof, a coating comprising a solid insulating material, the coating being conformal to the surface, adhering to the surface, and separating the surface from the insulating gel, with the insulating gel adhering to the coating.

12. The HV transformer of claim 11, wherein the coating is adapted for limiting electron emission from the bottom external housing into the insulating gel.

13. The HV transformer according to claim 11, wherein the coating is provided on an internal surface of the bottom external housing.

14. The HV transformer according to claim 11, wherein the coating is additionally provided on an external surface of the core.

15. The HV transformer according to claim 11, wherein the coating comprises a high dielectric strength material.

16. A high voltage (HV) transformer comprising:

an electrically conductive bottom external housing;

an electrically conductive bottom support flange on the bottom external housing;

an electrically conductive core within the bottom external housing; and electric insulation material comprising an insulating gel filling an enclosed space between the bottom support flange and the core;

wherein the bottom support flange and the core each have, on a surface thereof, a respective coating comprising a solid insulating material, the coating being conformal to the surface, adhering to the surface, and separating the surface from the insulating gel, with the insulating gel adhering to the coating.

17. The HV transformer of claim 16, wherein the respective coatings are adapted for limiting electron emission from the bottom support flange and the core into the insulating gel.

18. The HV transformer according to claim 16, wherein at least one of the respective coatings is provided on an internal surface of the bottom support flange.

19. The HV transformer according to claim 16, wherein at least one of the respective coatings is provided on an external surface of the core.

20. The HV transformer according to claim 16, wherein at least one of the respective coatings comprises a high dielectric strength material.

* * * * *